United States Patent [19]

Honjo

[11] Patent Number: 4,588,900
[45] Date of Patent: May 13, 1986

[54] INVERTER CONTROL SYSTEM
[75] Inventor: Kenji Honjo, Hyogo, Japan
[73] Assignee: Mitsubishi Denki Kabushiki Kaisha, Tokyo, Japan
[21] Appl. No.: 673,329
[22] Filed: Nov. 20, 1984
[30] Foreign Application Priority Data
Nov. 21, 1983 [JP] Japan .................. 58-219098
[51] Int. Cl.⁴ ............................. H02J 9/00
[52] U.S. Cl. ............................ 307/66; 307/23; 307/24; 307/44
[58] Field of Search .................. 307/44-46, 307/48, 64, 66, 87, 86, 19, 20, 23, 24, 29; 363/49; 323/901

[56] References Cited
U.S. PATENT DOCUMENTS
4,409,533 10/1983 Kawabata ................ 307/87 X FOREIGN PATENT DOCUMENTS
2154279 of 1979 Japan .

Primary Examiner—A. D. Pellinen
Assistant Examiner—T. DeBoer
Attorney, Agent, or Firm—Bernard, Rothwell & Brown

[57] ABSTRACT

An inverter control system for selectively operating on one of an inverter and backup power source to supply a load current comprises a PLL circuit which includes an integrating amplifier and is operative to synchronize the inverter operation with the voltage of the backup power source. When the power supply to the load is switched from the backup power source to the inverter, a.c. switches for the switching operation are controlled so that both the backup power source and inverter are active simultaneously for a certain period, and during the parallel operation the integrating amplifier is supplied with a reference signal which operates on the inverter to increase its shared load current.

5 Claims, 4 Drawing Figures

INVERTER CONTROL SYSTEM

BACKGROUND OF THE INVENTION

1. Field of the Invention

The present invention relates to an inverter control system which controls switching of power supply from a backup power source to an inverter.

2. Description of the Prior Art

The conventional control system for this purpose is shown in FIG. 1, in which the main circuit consists of an inverter 1, an a.c. reactor 2, a capacitor 3, thyristor a.c. switches 4 and 5, a backup power source 6, a reactor 7 for the backup power source, and a load 8. The main circuit is controlled by a PLL circuit made up of Schmitt trigger circuits 11 and 12, a phase comparator 13, a signal averaging resistor-capacitor pair 14 and 15, an operational amplifier 17 with its associated input resistor 16 and integrating capacitor 18, a voltage-controlled oscillator 19, and a voltage control circuit 20. Symbol $V_1$ indicates the inverter voltage, $I_1$ indicates the inverter current, $V_2$ and $I_2$ indicate the voltage and current of the backup power source 6, and $V_L$ indicates the load voltage.

In the above arrangement, the inverter 1 normally supplies power to the load 8, and in order for the load 8 in the event of failure to be switched to the backup power source 6 without a momentary power break, it is controlled by the PLL circuit to operate synchronously with the backup power source 6. The switching operation from the state of backup power supply to the normal state of power supply by the inverter 1 will be described with reference to FIG. 2. In switching a rated power supply of the load 8 from the backup power source 6 to the inverter 1 without a momentary power break, when the inverter switch 4 is turned on and the backup power source switch 5 is turned off at a time point $t_1$, the inverter circuit $I_1$ which makes a full transition of 0 to 100% causes a large transient variation in the inverter voltage, i.e., load voltage $V_L$, due to the impedance of the a.c. reactor 2, as shown in the figure, and this is a major drawback of the conventional switching circuit.

SUMMARY OF THE INVENTION

An object of the present invention is to provide an inverter controller which causes extremely little transient variation in the load voltage when the power source is switched from the backup power source to the inverter.

The inventive inverter controller comprises an a.c. switch means which selectively operates on one of an inverter and a backup power source to supply a current to a load, a PLL circuit including an amplifier and operative to synchronize the inverter operation with the voltage of the backup power source, a means for supplying a certain reference voltage to the input of the amplifier through a switch means, and a switch control means which controls the a.c. switch means so as to operate on both the inverter and backup power source to supply their outputs simultaneously to the load in a transient period when the backup power source is switched to the inverter, and, during this parallel operation, controls the switch means to supply the reference voltage to the amplifier. During the parallel operation of the inverter and backup power source, the reference voltage supplied continuously to the input of the integrating amplifier causes the amplifier output to increase progressively the load current of the inverter. Accordingly, at the end of the parallel operation when the backup power source is cut off, the variation of the inverter current can be suppressed to an extremely small level.

DETAILED DESCRIPTION OF THE PREFERRED EMBODIMENT

Figure 1:
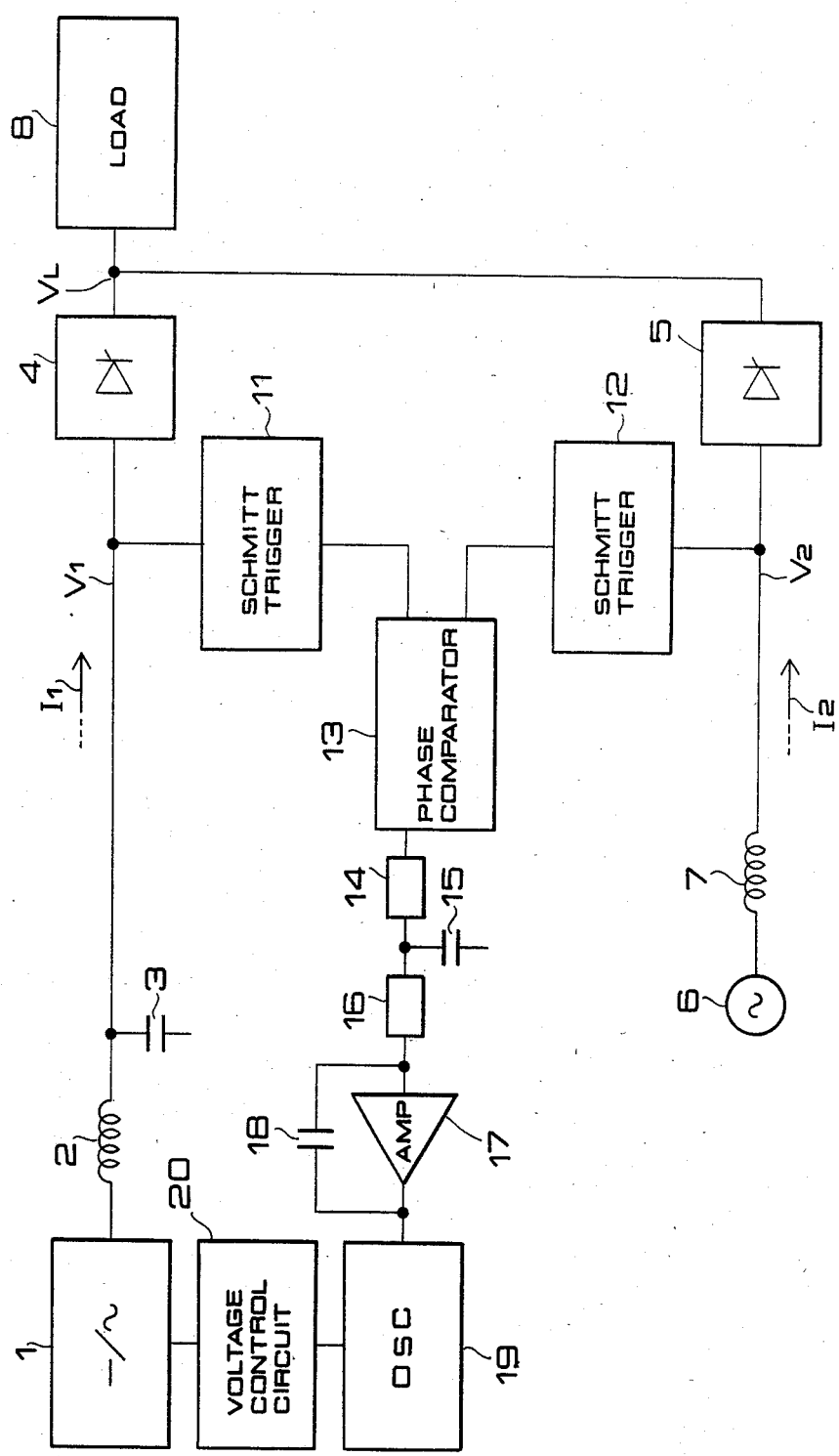
FIG. 1 is a block diagram showing the conventional inverter control system.
Figure 2:
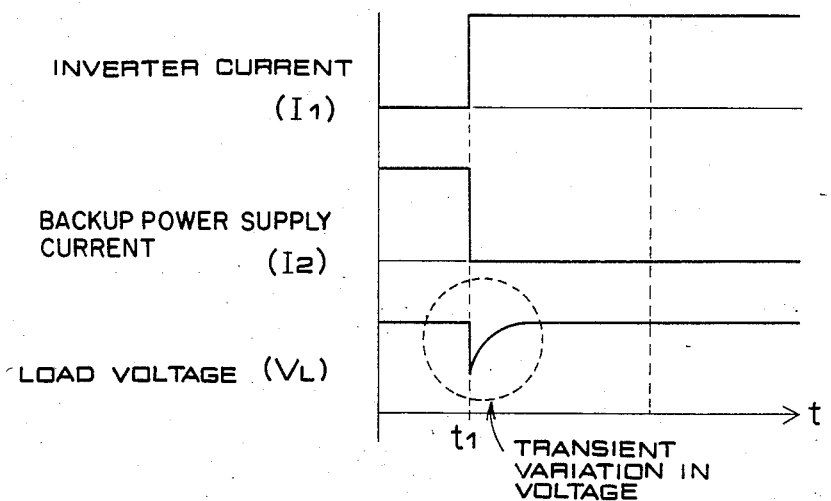
FIG. 2 is a set of waveform diagrams showing various electrical values observed in the arrangement of FIG. 1.
Figure 4:
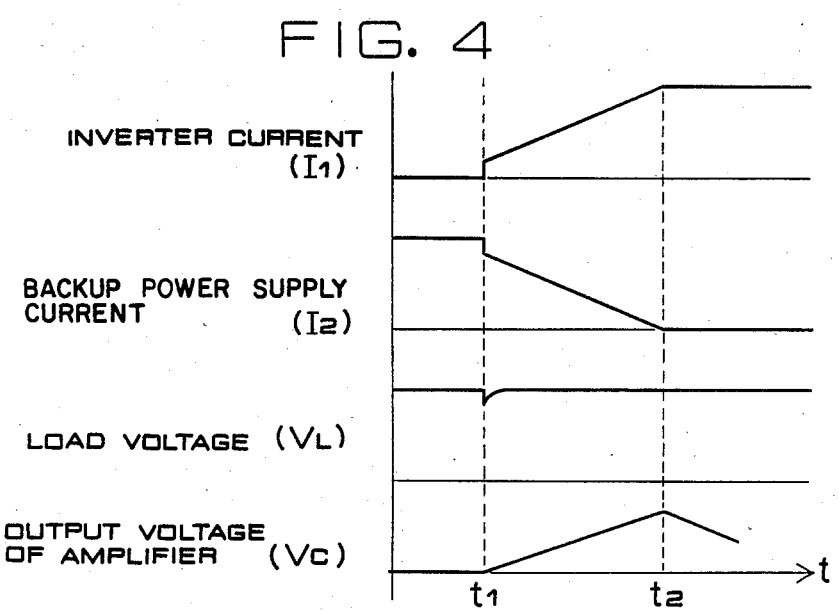
FIG. 4 is a set of waveform diagrams showing various electrical values observed in the arrangement of FIG. 3.
Figure 3:
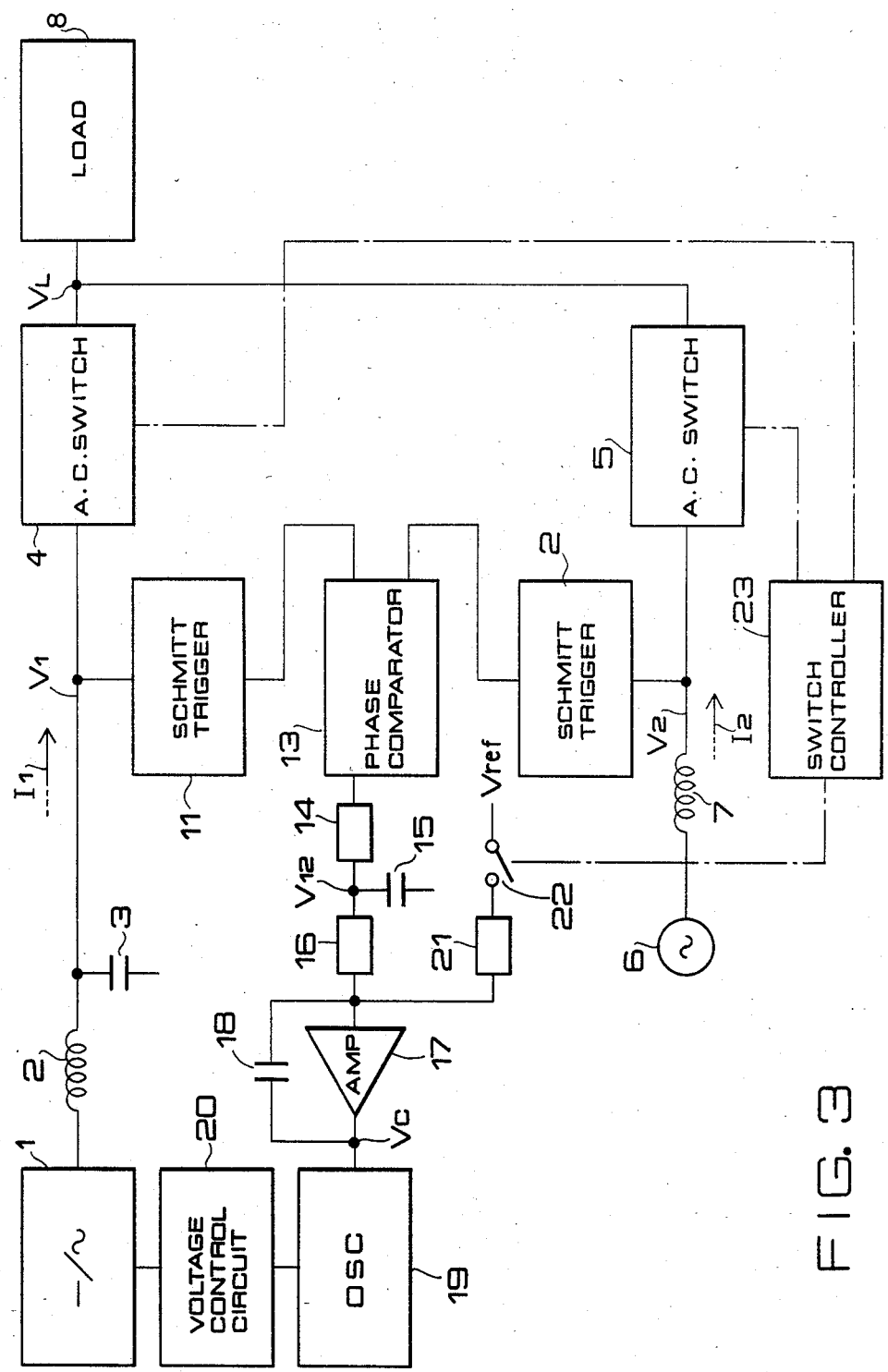
FIG. 3 is a block diagram showing the inverter control system embodying the present invention.

An embodiment of the present invention will now be described with reference to FIGS. 3 and 4. The system arrangement of FIG. 3 includes an inverter 1, an a.c. reactor 2, a capacitor 3, a.c. switches 4 and 5 such as thyristor switches, a backup power source 6, a reactor 7, a load 8, Schmitt trigger circuits 11 and 12, a phase comparator 13, a resistor 14, a capacitor 15, an operational amplifier 17 with an input resistor 16 and integration capacitor 18, a voltage-controlled oscillator 19, and a voltage control circuit 20. These components and their connection are identical to the system of FIG. 1, as referred to by the common symbols, and the explanation thereof will be omitted. The inventive system further includes a resistor 21 by which a reference voltage signal Vref is supplied to the input of the amplifier 17 through a switch 22, and a switch controller 23 which controls the a.c. switches 4 and 5 and the switch 22.

The operation of the arrangement in FIG. 3 will be described with reference to FIG. 4. Following the operation of power supply from the backup power source 6, the inverter switch 4 is turned on at a time point of $t_1$ and, at the same time, the reference voltage Vref is applied through the resistor 21 to the input of the amplifier 17. After the parallel operation of the inverter 1 and backup power source 6 for a certain duration, the backup switch 5 is turned off at a time point $t_2$ and, at the same time, the reference voltage Vref is removed from the amplifier input. These switching operations are conducted by the switch controller 23. During the parallel operation of the two power sources after $t_1$, their output voltages $V_1$ and $V_2$ are forced to have the same magnitude and phase, resulting in a nullified phase difference signal $V_{12}$. However, due to the presence of the reference voltage signal Vref, the output $V_c$ of the amplifier 17 varies at a rate determined by the integration capacitor 18 and input resistor 16 as shown in the figure, causing the voltage-controlled oscillator 19 to vary progressively the phase of the inverter. By choosing the polarity of the reference voltage signal Vref such that the phase variation is a leading phase of the inverter voltage, the inverter 1 is controlled to increase its shared load current progressively during a period from $t_1$ to $t_2$, and on this account when the backup switch 5 is turned off the inverter current $I_1$ does not vary abruptly and, therefore, there is very little variation in the load voltage $V_L$ caused by the switching operation.

For the a.c. switches 4 and 5, thyristor switches may effectively be employed, or alternatively these switches may be mechanical switches such as contactors since the two a.c. switches are allowed to have a simultaneous on-period ($t_1$ to $t_2$) of a few cycles or more of the power frequency.

According to the present invention, as described above, the amplifier in the PLL circuit is supplied at its input with a reference voltage signal for a certain period when the backup power source is switched to the inverter so that both power sources are active simultaneously during that period, whereby the transient variation of the inverter current at switching is made small, and thus the transient load voltage variation can effectively be reduced.

What is claimed is:

1. An inverter control system comprising:
   an alternating current (a.c.) switch means which selectively operates on one of an inverter and a backup power source to supply a current to a load;
   a phase locked loop (PLL) circuit including an integrating amplifier and operative to synchronize the operation of said inverter with the voltage of said backup power source;
   a means supplying a certain reference voltage signal to the input of said amplifier through a second switch means;
   and a switch control means which controls said a.c. switch means so as to operate on both of said inverter and backup power source to supply their outputs simultaneously to said load in a parallel operation in a transient period when supply power to said load is being switched from said backup power source to said inverter and, during said parallel operation, controls said second switch means to supply said reference voltage signal to said amplifier, said reference voltage signal causing the output of said amplifier to increase progressively the current supplied by the inverter to the load.

2. An inverter control system according to claim 1, wherein said a.c. switch means comprises a first a.c. switch inserted between said inverter and said load, and a second a.c. switch inserted between said backup power source and said load.

3. An inverter control system according to claim 2, wherein each of said first and second a.c. switches comprises a thyristor a.c. switch.

4. An inverter control system according to claim 2, wherein each of said first and second a.c. switches comprises a mechanical switch.

5. An inverter control system according to claim 1, wherein said PLL circuit comprises a first Schmitt trigger circuit responsive to the output voltage of said inverter, a second Schmitt trigger circuit responsive to the output voltage of said backup power source, a phase comparator providing an output in response to the phase difference between the outputs of said first and second Schmitt trigger circuits, said amplifier amplifying the output of said comparator, and a voltage-controlled oscillator providing an output at a frequency responsive to the output of said amplifier.

* * * * *